June 13, 1939.  O. G. BENNETT  2,162,395
APPARATUS FOR ANALYZING GASES
Filed July 1, 1936  2 Sheets—Sheet 1
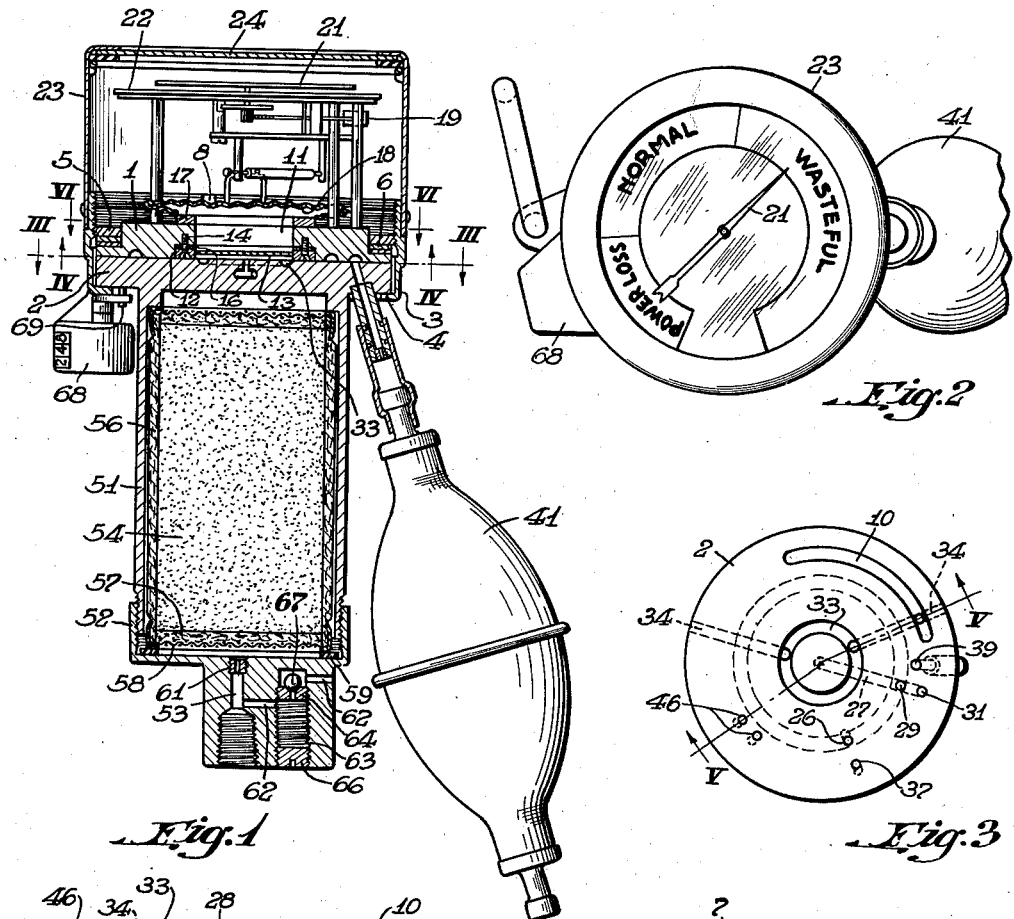
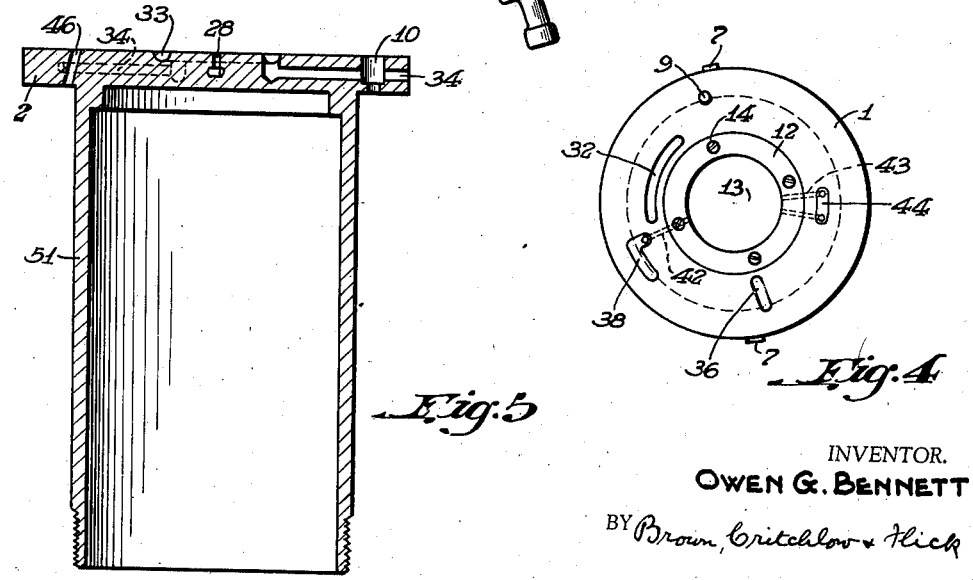
INVENTOR.
OWEN G. BENNETT
BY Brown, Critchlow & Flick
his ATTORNEYS.

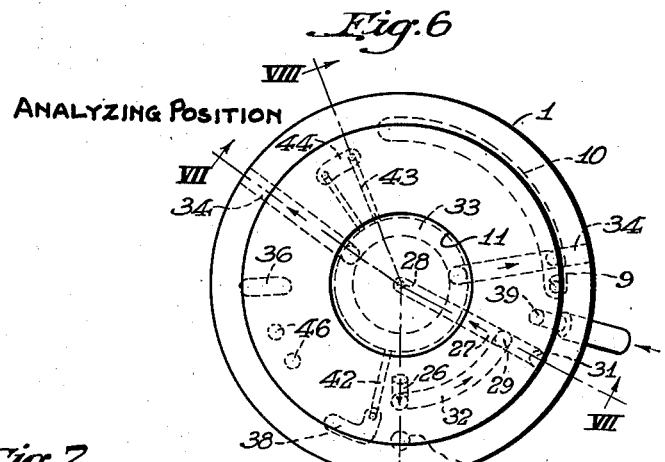
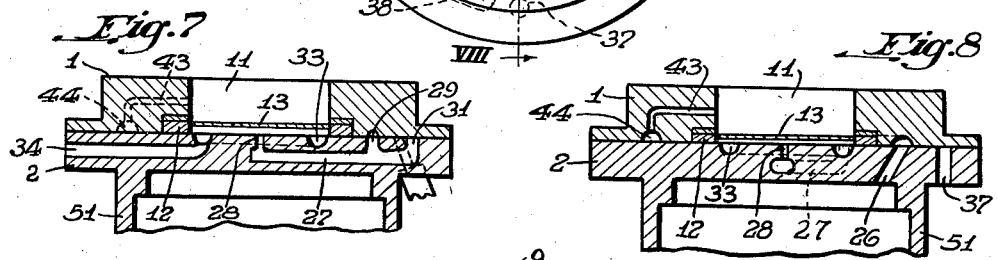
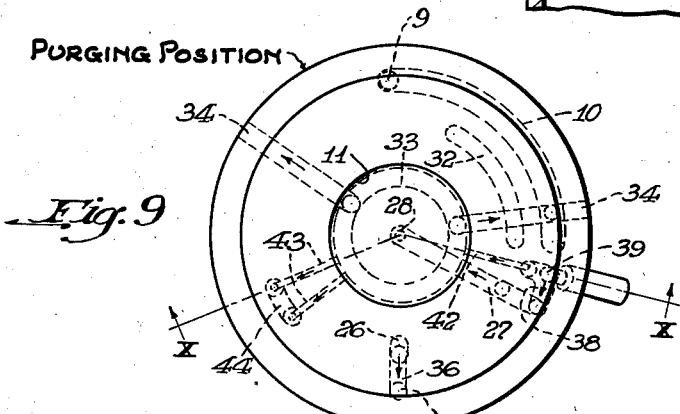
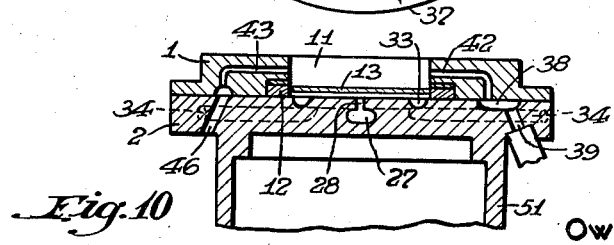

Patented June 13, 1939

2,162,395

UNITED STATES PATENT OFFICE 2,162,395

APPARATUS FOR ANALYZING GASES

Owen G. Bennett, Pittsburgh, Pa., assignor to Catalyst Research Corporation, Pittsburgh, Pa., a corporation of Maryland Application July 1, 1936, Serial No. 88,351

4 Claims. (Cl. 73—51)

This invention relates to gas analysis, and more particularly to apparatus for analyzing gases by diffusion.

As is known by those skilled in this art, in diffusion analysis gases are flowed across one side of a diffusion diaphragm and the pressure change caused on the opposite side of the diaphragm by the diffusion of a gas or gases therethrough is then measured. The pressure created within any given period of time by diffusion of a gas in this manner depends upon its diffusion rate, and the latter bears a direct relation to the density of the gas. Consequently, some gases will create more pressure than others, and from the pressure registered various information pertaining to gases can be rapidly, accurately and readily determined. For example, by diffusion it is a simple matter to fractionate a gaseous mixture to separate one or more constituents, to find the relative density of a gas, or to determine the composition of gaseous mixtures.

One field in which the possibilities for gas analyzing apparatus are especially great is that relating to the analyzing of exhaust gases of internal combustion engines. The relative proportions of the constituent gases of an exhaust gas indicate whether or not the engine carburetor is set properly and thereby whether fuel is being wasted, power is being lost, or the engine is running efficiently. However, the apparatus used for that purpose heretofore leave much to be desired in cost, simplicity and accuracy.

It is among the objects of this invention to provide apparatus for analyzing gases, and particularly for determining the composition of a gaseous mixture, which is light, compact, simple in construction and operation, operable by unskilled persons, quickly responsive, and accurate and dependable under all normal conditions. A more specific object is to provide a simple apparatus for quickly and accurately analyzing the exhaust gases of internal combustion engines.

The preferred embodiment of the invention is illustrated in the accompanying drawings in which Fig. 1 is a central vertical section through the analyzer; Fig. 2 is a plan view thereof; Fig. 3 is a plan view, taken on line III—III of Fig. 1, of the lower plate serving as part of the valve forming the central portion of the apparatus; Fig. 4 is a bottom plan view, taken on line IV—IV of Fig. 1, of the upper plate of the valve; Fig. 5 is an enlarged vertical section taken on line V—V of Fig. 3; Fig. 6 is a plan view of the two valve plates, taken on line VI—VI of Fig. 1, showing them in the position they occupy during gas analysis; Figs. 7 and 8 are vertical sections taken on lines VII—VII and VIII—VIII, respectively, of Fig. 6; Fig. 9 is a plan view similar to Fig. 6, but showing the two valve plates in the position they occupy when the apparatus is being prepared for the next analysis; and Fig. 10 is a vertical section taken on the line X—X of Fig. 9.

In accordance with this invention, a valve is formed from two flat plates disposed face to face in sealing engagement and adapted to be rotated relative to each other on their common axis between operative and inoperative positions. One of the plates is provided with an opening with which a diffusion member is associated, while the two plates are provided with a plurality of passages that register only when the plates are in operative position to form a continuous passage through which gases are admitted to one side of the diffusion member. The opposite side of the diffusion member is in communication with a pressure-responsive device that registers the pressure of gases diffusing through the diffusion member. The plates are also provided with a plurality of passages that register only when the plates are in their inoperative position for connecting both sides of the diffusion member with a forced current of pure air to permit the apparatus to be purged between analyses.

In diffusion analysis the diffusion member initially separates the gases to be analyzed from a standard gas such as air, and a change in pressure on the standard gas side of the member is caused by diffusion of the gas having the least density through the diffusion member before the gas or gases on the opposite side of the member can diffuse through it in the opposite direction. In determining the relative proportions of certain constituent gases of a gaseous mixture an inaccurate result may be obtained if two or more gases diffuse through a diffusion member in the same direction at substantially the same rate, or if besides a gas having less density than the standard gas there is another gas having a greater density than the standard gas so that there is substantially as much tendency for the standard gas to pass through the diffusion member in one direction as there is for the low density gas to do so in the opposite direction.

For example, the exhaust gas of an internal combustion engine comprises largely carbon dioxide, carbon monoxide, nitrogen, oxygen and hydrogen, and if the proportion of hydrogen in the mixture is known the composition of the mixture can be determined. The densities of carbon monoxide, oxygen and nitrogen are substantially the same as that of air which may conveniently be used as the standard gas, but hydrogen is of less density and carbon dioxide is of greater density. If a mixture of these gases were flowed across a diffusion member the hydrogen would tend to diffuse through the member more rapidly than the air on the opposite side would diffuse in the opposite direction, but the air would tend to diffuse through the member more rapidly than the carbon dioxide on the opposite side. This would result in a tendency for the gases on the two sides of the diffusion member to balance and show but little pressure change. That is, the high density carbon dioxide would tend to cancel the low density hydrogen and the reading of the pressure indicator would be false. Therefore, it would not be possible to accurately ascertain the proportion of hydrogen alone in the mixture.

Consequently, a feature of this invention resides in the removal from the gaseous mixture, before it reaches the diffusion diaphragm, of any gases, other than the one the proportion of which relative to the remaining gases is to be determined, having densities materially different from that of the standard gas.

Referring to Fig. 1 of the drawings, a valve member is formed from two flat plates 1 and 2 held face to face by a collar 3 having an inwardly projecting flange 4 engaging the bottom of the lower plate, and by a retaining ring 5 threaded in the upper portion of the collar. To hold the two plates firmly together, but not so tightly that they can not be rotated relative to each other on their common axis, to open and close various passages with which they are provided, an undulating annular spring 6 is compressed between the retaining ring and the outer surface of upper plate 1, hereinafter called a "disc," around its thickened central portion. Rotation of the disc relative to the plate is effected by turning collar 3 to which the disc is connected by one or more peripheral lugs 7 (Fig. 4) that register with recesses 8 in the inner wall of the collar. Rotation of the disc in either direction is limited by a pin 9 projecting from its inner face into an arcuate recess 10 in the plate (Fig. 3).

It is a feature of this invention that the diffusion member is mounted in the valve, rather than outside of it. Accordingly, as shown in Figs. 1 and 4, the disc is provided with a relatively large central opening 11 extending axially therethrough with its inner end enlarged to form an annular recess for receiving the rim 12 of a diffusion diaphragm 13. The rim is provided with openings through which extend screws 14 that bind it to the disc with a sealing gasket 16 between. The diaphragm, which is thinner than the rim, is offset from the opposite faces of the rim to space it a short distance from plate 2. Although any suitable type of diffusion diaphragm may be used, it is preferred to use one made by compressing finely divided nickel made by distillation of mercury from a nickel amalgam. Such a diaphragm is described and claimed in my Patent No. 2,045,379, granted June 23, 1936.

Secured to the outer face of the disc around opening 11 is a ring 17 to which a pressure-actuated diaphragm 18 is securely connected. Operatively connected to this diaphragm is a mechanism 19 of well-known construction for magnifying the movements of the diaphragm under pressure, and for indicating those movements by means of a needle 21 which turns on a dial 22. The pressure meter thus formed is enclosed by a cover 23 screwed to collar 3 and provided in its outer end with a glass window 24 (Fig. 2).

To permit gas that is to be analyzed to flow through the valve member and across the plate side of the diffusion diaphragm, plate 2, as shown in Figs. 3, 6, and 8, is provided with an inlet passage 26 to the outer end of which the gas is supplied, and the plate and disc are provided with other passages which connect the inlet passage to the plate side of the diffusion diaphragm when the plates are turned to analyzing position. Thus, in addition to inlet passage 26 the plate is provided with a radial passage 27 which communicates at its inner end with an axial passage 28 opening directly below the center of the diffusion diaphragm, and at its outer end portion with two passages 29 and 31 opening to the disc. The inner face of the disc is provided with an arcuate groove 32 (Figs. 4 and 6) which extends from inlet passage 26 to passage 29, so that gas entering the inlet passage flows in the direction of the arrows between the plate and disc in groove 32 into radial passage 27 and up to the diaphragm through axial passage 28 (Fig. 7). The gas then flows outwardly across the diaphragm into an annular groove 33 in the plate below the edge of the diaphragm, and out to the atmosphere through one or more radial passages 34 in the plate (Figs. 5 and 7). Whatever gas diffuses through the diaphragm creates pressure between the two diaphragms whereby pressure diaphragm 18 actuates meter mechanism 19 by which the needle is turned on the dial to give a reading.

After the reading has been taken the disc is turned to its inoperative position, shown in Figs. 9 and 10, wherein disc groove 32 is out of register with plate passages 26 and 29 so that gas can not reach the diffusion diaphragm. While the valve is in its inoperative position the gas entering the inlet passage is led out of the valve through a radial groove 36 in the inner face of the disc connecting the inner end of the inlet passage to the inner end of an outlet 37 through the plate.

To permit the gas on both sides of the diffusion diaphragm to be swept out of the valve, following an analysis, the inner face of the disc is provided with a groove 38 (Fig. 4) that connects passage 31 to the inner end of a passage 39 through the plate which connects at its outer end with suitable means for creating a current of air, such as a rubber bulb 41. Extending radially inwardly through the disc from disc groove 38 to opening 11 between the two diaphragms is a duct 42. Extending outwardly from between the diaphragms is a pair of outlet ducts 43 that terminate in a groove 44 in the inner face of the disc that registers with the inner ends of a pair of outlets 46 through the plate. When the bulb is compressed, a current of air is forced in the direction of the arrows through disc groove 38 and radial plate passage 27 and sweeps the gas from beneath the diaphragm and out through outlet passages 34, and another current of air is forced through disc duct 42 to sweep the gas between the diaphragms out through the disc outlet ducts 43 and plate outlets 46. Leakage of gas or air between the disc and plate is prevented by a sealing liquid between them.

As previously indicated herein, in a mixture a constituent gas, other than the one the proportion of which in the mixture is to be determined, having a density materially different than that of the standard gas used, will cause apparatus of this type to give a false reading. Therefore, provision is made for removing the objectionable gas before it can reach the diffusion diaphragm. To this end there is provided a cylindrical barrel 51 integral, in the embodiment shown, with the outer face of plate 2 and surrounding the outer end of inlet passage 26. The outer end of the barrel is closed by a screw cap 52 (Fig. 1) having a passage 53 therethrough adapted to be connected by a hose or the like to the source of gas to be analyzed, such as to the exhaust pipe of an internal combustion engine.

Removably disposed in the barrel in the path of gas passing through it is a charge of material 54 of a character adapted to absorb the gas that is to be removed. This material is preferably contained in a cartridge 56 so that it can be easily handled. The ends of the cartridge are closed by porous cloth pads 57 and screens 58 to hold the material in place without interfering with the passage of gas through it. Disposed between the screw cap and the rim of the cartridge is a gasket 59 to insure that none of the gas will escape past the cartridge. When this apparatus is to be used for analyzing exhaust gases, in which carbon dioxide is the objectionable gas that prevents accurate analysis, the cartridge is filled with a carbon dioxide absorbing material such as soda lime which is suitable for temperatures above freezing. In sub-freezing temperatures it may be found to be desirable to use some other carbon dioxide absorbing material.

As it requires only a very small amount of gas to give a reading, the inner end of cap passage 53 is restricted, as by a plug 61, and the cap is provided with an outlet duct 62 leading laterally from the passage to the atmosphere for the escape of excess gas. To prevent gas from escaping through duct 62 when there is no more than enough to operate the apparatus, the duct is provided with a check valve. A suitable check valve may be formed by providing the fitting with a threaded bore 63 parallel to passage 53 and screwing a valve seat plug 64 into the bore. The outlet duct is so positioned that its inner portion enters the bore below the seat, and its outer portion leaves the bore from above the seat. The outer end of the bore is closed by a plug 66, and a ball 67 rests loosely on the valve seat. The weight of the ball is such that it seats whenever the pressure of the ingoing gas starts to drop below that required for the apparatus and thereby prevents any of the gas from escaping. However, as long as there is more gas than needed the excess will escape through outlet duct 62 by unseating the ball.

In order to keep a record of the number of analyses made so that the cartridge will be replaced at the proper time, a meter 68 is preferably attached to collar 3. This meter, which is of well-known construction, is actuated by pins 69, projecting from plate 2, every time the collar is turned from analyzing to purging position.

In analyzing a gaseous mixture with this apparatus, for example, exhaust gas of an internal combustion engine, passage 53 in cap 52 is connected by a hose or the like to the exhaust pipe. Disc 1 is turned relative to plate 2 to the purging position shown in Fig. 9, and the bulb is compressed a few times to flush air across both sides of the diffusion diaphragm. During this operation the exhaust gases entering barrel 51 leave it through passage 26, groove 36 and outlet 37 (Fig. 9) without reaching the diffusion diaphragm.

The disc is then turned to analyzing position, as shown in Fig. 6, wherein the chamber between the diffusion and pressure diaphragms is closed, and inlet passage 26 is connected with the plate side of the diffusion diaphragm. The carbon dioxide in the exhaust gas passing through the barrel is removed by the material in the cartridge, and the residue of the mixture flows across the diffusion diaphragm. The hydrogen in this mixture diffuses through that diaphragm rapidly and creates a pressure that is registered by the meter.

As the amount of pressure created in this manner indicates the proportion of hydrogen in the mixture, the proportion of the other remaining constituent gases can be calculated. From the various proportions of gases in the mixture it is possible to tell how efficiently the engine is operating. Preferably, the dial is calibrated in some such manner as indicated in Fig. 2 in order to give a direct reading of engine operating efficiency. After the reading has been taken, the disc is turned back to its purging position and air is forced through the apparatus by the bulb to purge it of the gases that were analyzed.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A gas analyzer comprising a plate having an inlet passage therethrough adapted to be connected to a source of gas to be analyzed, a disc rotatably disposed against said plate in sealing engagement therewith and provided with an opening, a diffusion diaphragm spaced from said plate and closing the end of said opening adjacent thereto, a pressure-actuated diaphragm closing the opposite end of said opening and spaced from the diffusion diaphragm, a meter operatively connected to said pressure diaphragm, said disc and plate being provided with passages connecting said inlet passage to the plate side of the diffusion diaphragm, said passages being sealed from one another when the disc and plate are rotated relative to each other to inoperative position, said plate being provided with an outlet passage connecting said plate side of the diffusion diaphragm with the atmosphere at all times, and means for producing a current of air, said disc and plate being provided with ducts that register when the disc and plate are in said inoperative position for connecting said means with both sides of the diffusion diaphragm and for connecting the pressure diaphragm side of said diffusion diaphragm with the atmosphere.

2. A gas analyzer comprising two plates disposed face to face in sealing engagement and adapted to be rotated relative to each other between operative and inoperative positions, one of said plates being provided with an opening therethrough, a diffusion diaphragm closing one end of said opening, said plates being provided with passages that register when the plates are in said operative position for conducting a source of gas to be analyzed across said end of said opening, means connected to the opposite end of said opening for indicating the pressure of gas diffusing through said diaphragm, and means for creating a current of air, said plates being provided with ducts that connect said air-creating means with both sides of said diaphragm when the plates are in said inoperative position, and said plates also being provided with ducts that connect both sides of said diaphragm with the atmosphere.

3. An exhaust gas analyzer comprising a plate having an inlet passage therethrough, a receptacle connected to one side of said plate and surrounding one end of said passage, said receptacle being adapted to be connected to an engine exhaust, a charge of carbon dioxide absorbing material in the receptacle, a disc rotatably disposed against the opposite side of said plate in sealing engagement therewith and provided with an opening, a diffusion diaphragm spaced from said plate and closing the end of said opening adjacent thereto, a pressure-actuated diaphragm closing the opposite end of said opening and spaced from the diffusion diaphragm, a meter operatively connected to said pressure diaphragm, said disc and plate being provided with passages connecting said inlet passage to the plate side of the diffusion diaphragm, said passages being sealed from one another when the disc and plate are rotated relative to each other to inoperative position, said plate being provided with an outlet passage connecting said plate side of the diffusion diaphragm with the atmosphere at all times, and means for producing a current of air, said disc and plate being provided with ducts that register only when the disc and plate are in said inoperative position for connecting said means with both sides of the diffusion diaphragm and for connecting the pressure diaphragm side of said diffusion diaphragm with the atmosphere.

4. A gas analyzer comprising a plate having an inlet passage therethrough adapted to be connected to a source of gas to be analyzed, a disc rotatably disposed against said plate in sealing engagement therewith and provided with an opening, a diffusion diaphragm spaced from said plate and closing the end of said opening adjacent thereto, means in communication with the opposite end of said opening for indicating changes in pressure in that opening, said disc and plate being provided with passages connecting said inlet passage to the plate side of the diffusion diaphragm, said passages being sealed from one another when the disc and plate are rotated relative to each other to inoperative position, said plate being provided with an outlet passage connecting said plate side of the diffusion diaphragm with the atmosphere at all times, and means for producing a current of air, said disc and plate being provided with ducts that register when the disc and plate are in said inoperative position for connecting said means with both sides of the diffusion diaphragm and for connecting the side of said diaphragm adjacent said pressure indicating means with the atmosphere.

OWEN G. BENNETT.